(12) United States Patent
Cuzzort et al.

(10) Patent No.: US 9,906,594 B2
(45) Date of Patent: Feb. 27, 2018

(54) TECHNIQUES FOR SHAPING REAL-TIME CONTENT BETWEEN MULTIPLE ENDPOINTS

(71) Applicant: PRYSM, INC, San Jose, CA (US)

(72) Inventors: Adam P. Cuzzort, Westfield, IN (US); Brandon Fischer, Carmel, IN (US)

(73) Assignee: PRYSM, INC., San Jose, CA (US)

( * ) Notice: Subject to any disclaimer, the term of this patent is extended or adjusted under 35 U.S.C. 154(b) by 0 days.

(21) Appl. No.: 14/675,602

(22) Filed: Mar. 31, 2015

(65) Prior Publication Data
US 2015/0207878 A1 Jul. 23, 2015
US 2017/0180472 A9 Jun. 22, 2017

Related U.S. Application Data

(63) Continuation-in-part of application No. 13/773,015, filed on Feb. 21, 2013.

(60) Provisional application No. 61/601,182, filed on Feb. 21, 2012.

(51) Int. Cl.
| | |
|---|---|
| *G06F 15/16* | (2006.01) |
| *H04L 29/08* | (2006.01) |
| *G06F 3/14* | (2006.01) |
| *H04L 29/06* | (2006.01) |
| *H04N 7/14* | (2006.01) |
| *H04M 7/00* | (2006.01) |

(52) U.S. Cl.
CPC ........ *H04L 67/1095* (2013.01); *G06F 3/1454* (2013.01); *H04L 65/1089* (2013.01); *H04L 65/403* (2013.01); *H04L 65/4084* (2013.01); *H04N 7/14* (2013.01); *H04M 7/0027* (2013.01)

(58) Field of Classification Search
CPC ............................ G06Q 10/101; G06Q 10/10
See application file for complete search history.

(56) References Cited

U.S. PATENT DOCUMENTS

| | | | |
|---|---|---|---|
| 7,769,810 B1 | 8/2010 | Kaufman | |
| 7,908,325 B1 | 3/2011 | Pabla et al. | |
| 8,407,290 B2 | 3/2013 | Abt, Jr. et al. | |
| 2007/0198744 A1* | 8/2007 | Wensley | H04L 12/1827 709/248 |
| 2008/0244461 A1* | 10/2008 | Kropivny | H04L 12/1827 715/856 |
| 2008/0313536 A1* | 12/2008 | Larsen | G06Q 10/06 715/273 |
| 2009/0033616 A1 | 2/2009 | Miyagi | |
| 2009/0157811 A1 | 6/2009 | Bailor et al. | |
| 2009/0172101 A1 | 7/2009 | Arthursson | |
| 2009/0271713 A1 | 10/2009 | Stull et al. | |
| 2011/0258216 A1 | 10/2011 | Supakkul et al. | |

(Continued)

*Primary Examiner* — Shean Tokuta
(74) *Attorney, Agent, or Firm* — Artegis Law Group, LLP

(57) ABSTRACT

A client application coupled to a display generates a shared workspace that includes a content stream derived from a local user device a well as another content stream derived from a remote device. The client application is configured to detect when a user device is coupled locally, and to receive a content stream from that device. The client application determines when the other content stream is available, and then accesses that content stream via a streaming infrastructure. The client application then generates the shared workspace by rendering the two content streams to a display.

19 Claims, 9 Drawing Sheets

(56) References Cited

U.S. PATENT DOCUMENTS

| | | | |
|---|---|---|---|
| 2012/0033037 A1* | 2/2012 | Chen | H04N 19/597 |
| | | | 348/43 |
| 2013/0130218 A1* | 5/2013 | Hargreaves | G06F 19/3431 |
| | | | 434/362 |
| 2013/0198653 A1 | 8/2013 | Tse et al. | |
| 2013/0218998 A1 | 8/2013 | Fischer et al. | |
| 2013/0282820 A1* | 10/2013 | Jabri | H04L 65/403 |
| | | | 709/204 |
| 2013/0282876 A1* | 10/2013 | Watanabe | H04L 67/06 |
| | | | 709/219 |
| 2013/0305184 A1 | 11/2013 | Kim et al. | |
| 2014/0032770 A1* | 1/2014 | Pegg | H04L 29/06414 |
| | | | 709/228 |
| 2014/0033067 A1* | 1/2014 | Pittenger | G06F 21/606 |
| | | | 715/751 |
| 2014/0047332 A1 | 2/2014 | Liu et al. | |
| 2014/0090084 A1 | 3/2014 | Goodinson | |
| 2014/0240445 A1* | 8/2014 | Jaynes | G06F 3/1454 |
| | | | 348/14.07 |
| 2014/0307230 A1 | 10/2014 | Hajjar | |
| 2014/0313278 A1* | 10/2014 | Periyannan | H04L 65/403 |
| | | | 348/14.08 |
| 2014/0351721 A1 | 11/2014 | Deluca et al. | |
| 2014/0362119 A1 | 11/2014 | Freund et al. | |
| 2014/0362300 A1 | 12/2014 | Hajjar | |
| 2015/0058770 A1 | 2/2015 | Steinbach et al. | |
| 2015/0205453 A1 | 7/2015 | Carlos et al. | |
| 2015/0213355 A1 | 7/2015 | Sharma et al. | |

\* cited by examiner

TECHNIQUES FOR SHAPING REAL-TIME CONTENT BETWEEN MULTIPLE ENDPOINTS

CROSS-REFERENCE TO RELATED APPLICATIONS

This application is a continuation-in-part (CIP) of United States patent application titled "System, Method, and Computer-Readable Medium for Interactive Collaboration" filed on Feb. 21, 2013 and having Ser. No. 13/773,015, which claims the benefit of provisional application titled, "SYSTEM, METHOD, AND COMPUTER-READABLE MEDIUM FOR INTERACTIVE COLLABORATION", filed Feb. 21, 2012 and having Ser. No. 61/601,182. The subject matter of these related applications is hereby incorporated herein by reference.

BACKGROUND OF THE INVENTION

Field of the Invention

Embodiments of the present invention relate generally to content sharing, and, more specifically, to techniques for sharing real-time content between multiple endpoints.

Description of the Related Art

A conventional screen sharing application allows geographically disparate parties to share display data with one another across vast distances. Typically, each party executes an instance of the screen sharing application on a local computer. One of the parties is designated as the "leader." The leader assumes responsibility for curating the specific display data that is shared. For example, a first party designated as leader could share display data with a second party. The second party would then view that display data locally. As a general matter, when one party is designated as the leader, that party retains control over the screen sharing application until specifically relinquishing control to another party.

One drawback of the above approach is that the "leader" designation must be manually passed from one party to another in order to allow the other party to share display data. Consequently, if a first party is currently the leader, and a second party wishes to share display data, the second party cannot do so until the first party designates the second party as the leader. This process is overly complicated and generally interferes with effective communication between the two parties.

As the foregoing illustrates, what is needed is a more effective approach for sharing display data, and other types of data, between geographically separated parties.

SUMMARY OF THE INVENTION

One embodiment of the present invention sets forth a computer-implemented method for sharing content across a plurality of displays, including receiving a first stream from a first user device, accessing a second stream from a stream server, wherein the second stream originates from a second user device, generating a first workspace that includes the first stream and the second stream, and causing the first workspace along with the first stream and the second stream to be displayed on a first display.

At least one advantage of the present invention is that users may participate in the shared workspace simply by coupling a user device to the client application. Accordingly, the user need not request leader status or manually configure any settings in order to share a content stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. In addition, parenthetical labels have been used in conjunction with numeric labels to designate different instances of similar components. It is contemplated that features of one embodiment may be incorporated in other embodiments without further recitation.

DETAILED DESCRIPTION

Figure 1:
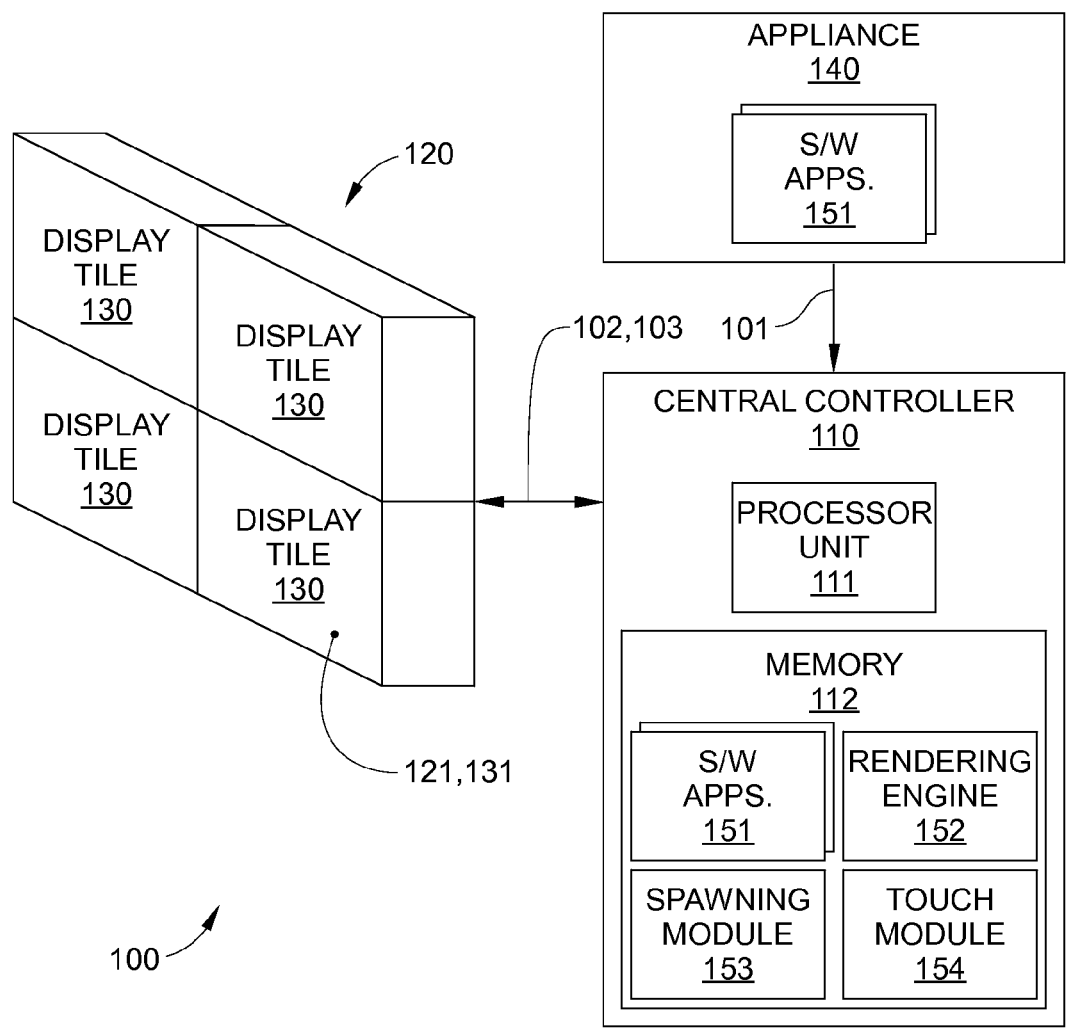
FIG. 1 is a block diagram of a display system configured to implement one or more aspects of the present invention.

FIG. 1 is a block diagram of a display system 100 configured to implement one or more aspects of the present invention. As shown, display system 100 includes, without limitation, a central controller 110 and a display 120. In some embodiments, display 120 is a display wall that includes multiple display tiles. Central controller 110 receives digital image content 101 from an appliance 140 or from an information network or other data routing device, and converts said input into image data signals 102. Thus, digital image content 101 may be generated locally, with appliance 140, or from some other location. For example, when display system 100 is used for remote conferencing, digital image content 101 may be received via any technically feasible communications or information network, wired or wireless, that allows data exchange, such as a wide area network (WAN), a local area network (LAN), a wireless (WiFi) network, and/or the Internet, among others.

Central controller 110 includes a processor unit 111 and memory 112. Processor unit 111 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor unit 111 may be any technically feasible hardware unit capable of processing data and/or executing software applications to facilitate operation of display system 100, including software applications 151, rendering engine 152, spawning module 153, and touch module 154. During operation, software applications 151, rendering engine 152, spawning module 153, and touch module 154 may reside in memory 112, and are described below in conjunction with FIG. 3. Alternatively or additionally, software applications 151 may also reside in appliance 140. In some embodiments, one or more of 151-154 may be implemented in firmware, either in central controller 110 and/or in other components of display system 100.

Memory 112 may include volatile memory, such as a random access memory (RAM) module, and non-volatile memory, such as a flash memory unit, a read-only memory (ROM), or a magnetic or optical disk drive, or any other type of memory unit or combination thereof. Memory 112 is configured to store any software programs, operating system, drivers, and the like, that facilitate operation of display system 100, including software applications 151, rendering engine 152, spawning module 153, and touch module 154.

Display 120 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand alone display, head mounted display or as a single or multi-screen tiled array of displays. Display sizes may range from smaller handheld or head mounted display devices to full wall displays. In the example illustrated in FIG. 1, display 120 includes a plurality of display light engine and screen tiles 130 mounted in a 2×2 array. Other configurations and array dimensions of multiple electronic display devices, e.g. 1×4, 2×3, 5×6, etc., also fall within the scope of the present invention.

In operation, display 120 displays image data signals 102 output from controller 110. For a tiled display, as illustrated in FIG. 1, image data signals 102 are appropriately distributed among display tiles 130 such that a coherent image is displayed on a display surface 121 of display 120. Display surface 121 typically includes the combined display surfaces of display tiles 130. In addition, display 120 includes a touch-sensitive surface 131 that extends across part or all surface area of display tiles 130. In one embodiment, touch-sensitive surface 131 senses touch by detecting interference between a user and one or more beams of light, including, e.g., infrared laser beams. In other embodiments, touch sensitive surface 131 may rely on capacitive touch techniques, including surface capacitance, projected capacitance, or mutual capacitance, as well as optical techniques, acoustic wave-based touch detection, resistive touch approaches, and so forth, without limitation. Touch-sensitive surface 131 enables users to interact with assets displayed on the wall using touch gestures including tapping, dragging, swiping, and pinching. These touch gestures may replace or supplement the use of typical peripheral I/O devices such as an external keyboard or mouse, although touch-sensitive surface 131 may receive inputs from such devices, as well.

In the context of this disclosure, an "asset" may refer to any interactive renderable content that can be displayed on a display, such as display 120, among others. Such interactive renderable content is generally derived from one or more content streams that include sequential frames of video data, corresponding audio data, metadata, and potentially other types of data. Generally, an asset may be displayed within a dynamically adjustable presentation window. For simplicity, an asset and corresponding dynamically adjustable presentation window are generally referred to herein as a single entity, i.e., an "asset." Assets may include images, videos, web browsers, documents, renderings of laptop screens, presentation slides, any other graphical user interface (GUI) of a software application, and the like. An asset generally includes at least one display output generated by a software application, such as a GUI of the software application. In one embodiment, the display output is a portion of a content stream. In addition, an asset is generally configured to receive one or more software application inputs via a gesture-sensitive display surface of a collaboration client system 140, i.e., inputs received via the gesture-sensitive display surface are received by the asset and treated as input for the software application associated with the asset. Thus, unlike a fixed image, an asset is a dynamic element that enables interaction with the software application associated with the asset, for example, for manipulation of the asset. For example, an asset may include select buttons, pull-down menus, control sliders, etc. that are associated with the software application and can provide inputs to the software application.

As also referred to herein, a "workspace" is a digital canvas on which assets associated therewith, and corresponding content streams, are displayed within a suitable dynamic presentation window on display 120. Typically, a workspace corresponds to the all of the potential render space of display 120, so that only a single workspace can be displayed on the surface thereof. However, in some embodiments, multiple workspaces may be displayed on display 120 concurrently, such as when a workspace does not correspond to the entire display surface. Assets associated with a workspace, and content streams corresponding to those content streams, are typically displayed in the workspace within a suitable presentation window that has user-adjustable display height, width, and location. Generally, a workspace is associated with a particular project, which is typically a collection of multiple workspaces.

In one embodiment, a server stores metadata associated with specific assets, workspaces, and/or projects that is accessible to display system 100. For example, such metadata may include which assets are associated with a particular workspace, which workspaces are associated with a particular project, the state of various setting for each workspace, annotations made to specific assets, etc. In some embodiments, asset metadata may also include size of the presentation window associated with the asset and position of the presentation window in a particular workspace, and, more generally, other types of display attributes. In some embodiments, asset size and location metadata may be calculated metadata that are dimensionless. In such embodiments, the asset size may be in terms of aspect ratio, and asset position in terms of percent location along an x- and y-axis of the associated workspace. Thus, when instances of display 120 are not uniformly sized, each asset within a shared workspace can still be positioned and sized proportional to the specific instance of display 120 in which is it being displayed. When multiple display systems 100 separately display a similar shared workspace, each such display system 100 may configure the local version of that shared workspace based on the corresponding metadata.

Touch-sensitive surface 131 may be a "multi-touch" surface, which can recognize more than one point of contact on display 120, enabling the recognition of complex gestures, such as two or three-finger swipes, pinch gestures, and rotation gestures as well as multiuser two, four, six etc. hands touch or gestures. Thus, one or more users may interact with assets on display 120 using touch gestures such as dragging to reposition assets on the screen, tapping assets to display menu options, swiping to page through assets, or using pinch gestures to resize assets. Multiple users may also interact with assets on the screen simultaneously. Again, examples of assets include application environments, images, videos, web browsers, documents, mirroring or renderings of laptop screens, presentation slides, content streams, and so forth. Touch signals 103 are sent from a touch panel associated with a display 120 to central controller 110 for processing and interpretation.

It will be appreciated that the system shown herein is illustrative and that variations and modifications are possible. For example, software applications 151, rendering engine 152, spawning module 153, and touch module 154 may reside outside of central controller 110.

Figure 2:
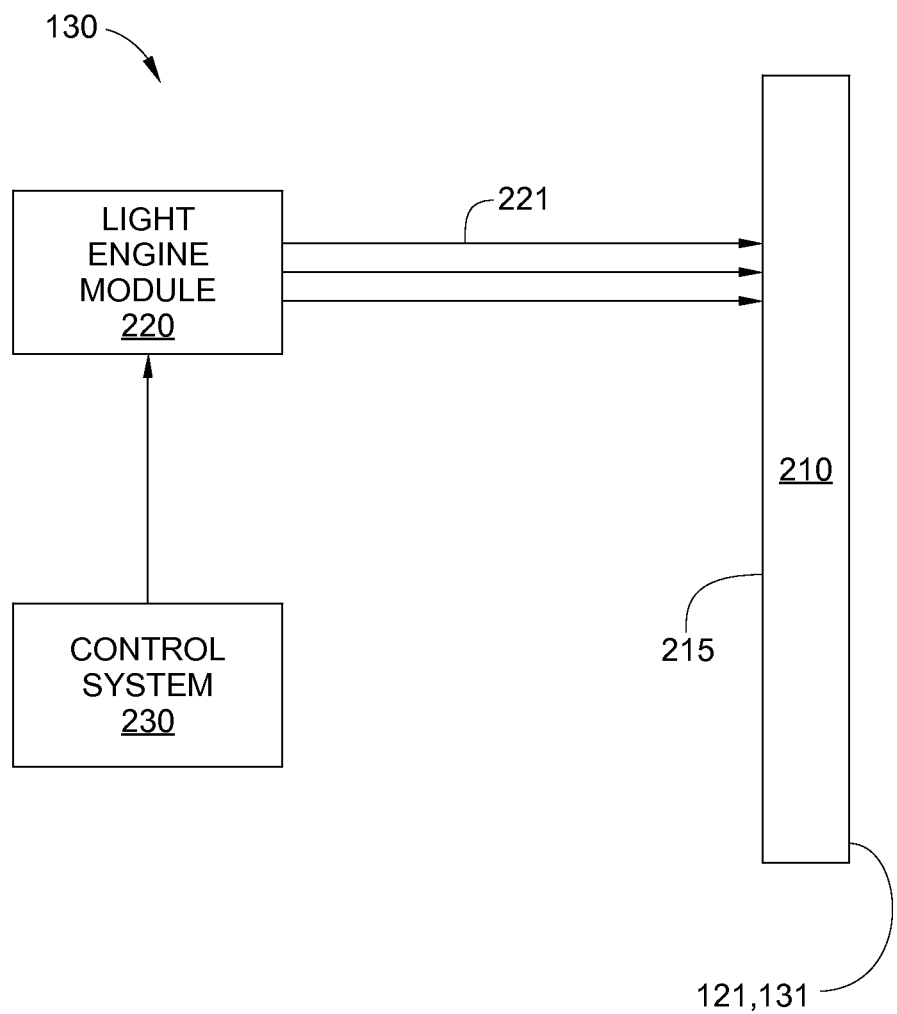
FIG. 2 is a schematic diagram of a display tile configured to implement one or more aspects of the present invention.

FIG. 2 is a schematic diagram of a display tile 130 configured to implement one or more aspects of the present invention. FIG. 2 is an example configuration only, and any other technically feasible display device suitable for forming display 120 may be implemented in alternative embodiments. As shown, display tile 130 includes, without limitation, a display screen region 210, a light engine module 220, and a control system 230. The display screen region 210 is configured to display digital images that are visible to a viewer.

Light engine module 220 is configured to emit one or more scanning beams (e.g., laser beams 221) onto a scan surface 215 of display screen region 210. Display screen region 210 may include a phosphor layer (not shown) that phosphoresces when excited by the optical energy conducted by the one or more laser beams 221, thereby creating visible light. The light engine module 220 is configured to emit one or more laser beams 221 that sweep across the phosphor layer of the display screen region 210 in a pulse width and pulse amplitude modulation manner in order to create visible light that represents an image. The visible light associated with the image emanates through an image surface of the display screen region 210 to a viewer.

The control system 230 is configured to transmit command data to the light engine module 220 to cause light engine module 220 to emit laser beams 221 onto scan surface 215. Control system 230 controls and modulates laser beams 221 emitted by the light engine module 220 so that laser beams 221 are modulated to carry the image to be displayed on scan surface 215. The control system can include a digital image processor that generates digital image signals for three different color channels and laser driver circuits that produce laser control signals carrying the digital image signals. The laser control signals are then applied to modulate the lasers, e.g., the currents for laser diodes.

More detailed descriptions of display devices suitable for being configured as a display tile 130 in display system 100 may be found in U.S. Patent Publication 2014/0307230, published Oct. 16, 2014 and entitled "Self Aligning Imager Array" and U.S. Patent Publication 2014/0362300, published Dec. 11, 2014 and entitled "Servo Feedback Control Based on Invisible Scanning Servo Beam in Scanning Beam Display Systems with Light-Emitting Screens."

Figure 3:
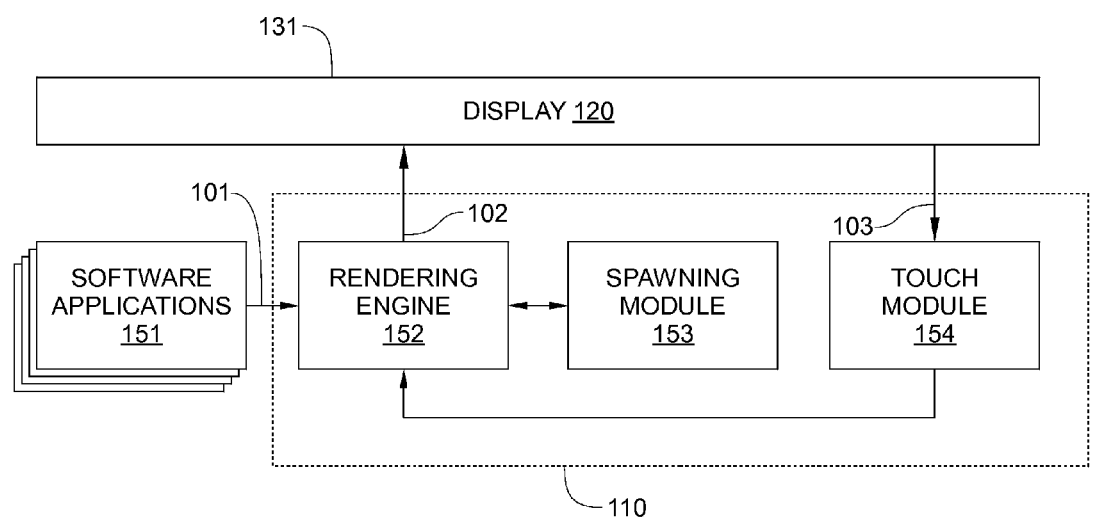
FIG. 3 is a block diagram illustrating the operation of the display system of FIG. 1, according to one embodiment of the present invention.

FIG. 3 is a block diagram illustrating the operation of display system 100, according to one embodiment of the present invention. As shown, FIG. 3 includes, without limitation, software applications 151, rendering engine 152, spawning module 153, and touch module 154. Software applications 151 generate assets to be displayed on display 120, including those derived from content streams. Examples of software applications 151 may include slide show presentation software, word processor software, collaboration design software, editing software (e.g. image, word, graphic editors), video player software, remote conferencing applications, and remote desktop clients.

Software applications 151 send digital image content 101 to rendering engine 152. Rendering engine 152 sends image data signals 102 to display 120 and is responsible for determining the content that is displayed on each pixel of display 120. Rendering engine 152 also manages displayed content by tracking displayed assets and the corresponding software application that generated each asset.

As described in greater detail below in conjunction with FIGS. 4-9, software applications 151 include a client application. The client application included therein is configured to enable the generation of a shared workspace for display on display 120. The shared workspace may include content streams received from computing devices coupled locally to display system 100, or content streams received from one or more other display systems with computing devices coupled locally thereto. Those content streams may be rendered within, or as part of, corresponding assets. The aforesaid client application thereby allows multiple display systems to display a shared workspace that includes content streams associated with a collection of different computing devices.

Figure 4:
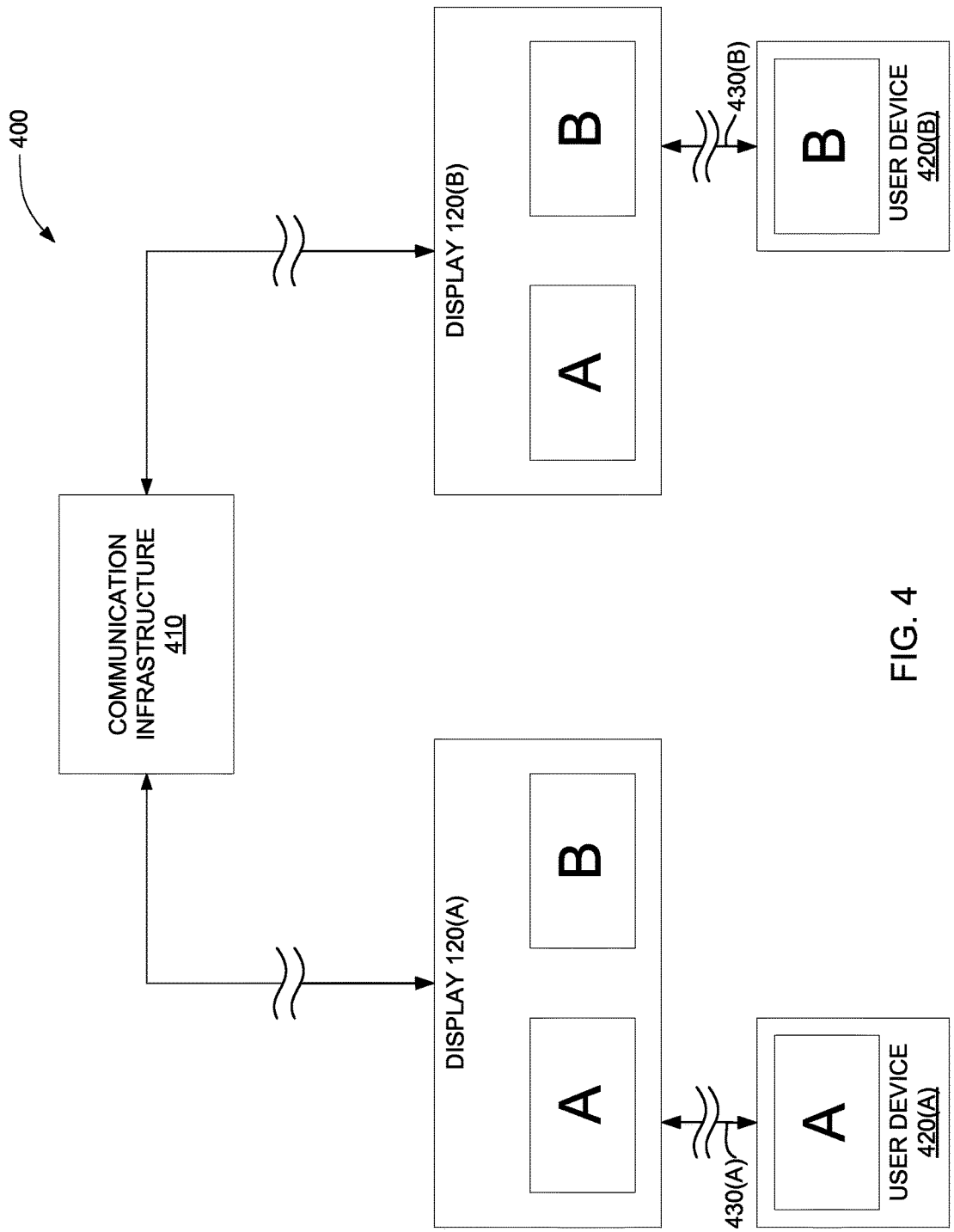
FIG. 4 is a conceptual diagram of a collaboration system configured to share content streams between displays, according to one embodiment of the present invention.

FIG. 4 is a conceptual diagram of a collaboration system configured to share content streams between displays, according to one embodiment of the present invention. As shown, collaboration system 400 includes displays 120(A) and 120(B) coupled together via a communication infrastructure 410. In one embodiment, each of displays 120(A) and/or 120(B) represents a different instance of display 120 of FIG. 1.

Display 120(A) is coupled to a user device 420(A) via a data connection 430(A). In one embodiment, display 120(A) forms part of an overarching instance of display system 100 of FIG. 1, to which user device 420(A) may be coupled. User device 420(A) may be a computing device, a video capture device, or any other type of hardware configured to generate content streams for display. In FIG. 4, user device 420(A) generates and displays content stream A. In one embodiment, content stream A is a stream of video content that reflects the display output of user device 420(A). When coupled to display 120(A), user device 420(A) also outputs content stream A to display 120(A) via data connection 430(A). In doing so, user device 420(A) may execute a software application to coordinate communication with display 120(A) via data connection 430(A). Data connection 430(A) may be a high-definition multimedia interface (HDMI) cable, analog connection, wireless connection, or any other technically feasible type of data connection. In response to receiving content stream A, display 120(A) displays content stream A, as is shown.

Similar to display 120(A), display 120(B) is coupled to a user device 420(B) via a data connection 430(B). In one embodiment, display 120(B) forms part of an overarching instance of display system 100 of FIG. 1, to which user device 420(B) may be coupled. User device 420(B) may be a computing device, a video capture device, or any other type of hardware configured to generate content streams for display. In FIG. 4, user device 420(B) generates and displays content stream B. In one embodiment, content stream B is a stream of video content that reflects some or all of the display output of user device 420(B). When coupled to display 120(B), user device 420(B) also outputs content stream B to display 120(B) via data connection 430(B). In doing so, user device 420(B) may execute a software application to coordinate communication with display 120(B) via data connection 420(B). Data connection 430(B) may be a high-definition multimedia interface (HDMI) cable, analog connection, wireless connection, or any other technically feasible type of data connection. In response to receiving content stream B, display 120(B) displays content stream B, as is shown.

As mentioned above, displays 120(A) and 120(B) may be included within respective instances of display system 100. In such embodiments, the display systems that include displays 120(A) and 120(B) are configured to interoperate in order to share content streams received locally, as described in greater detail below in conjunction with FIG. 5.

Figure 5:
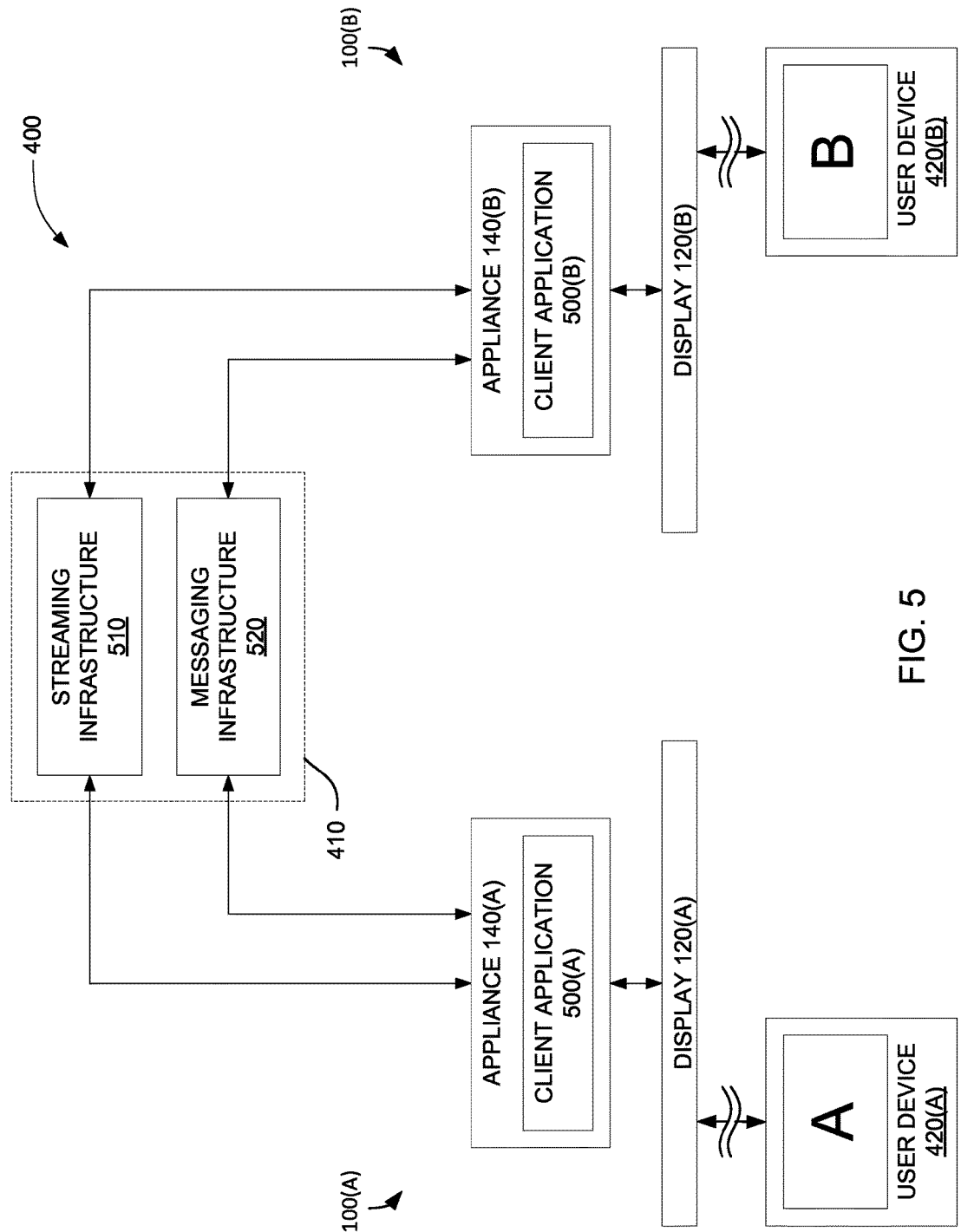
FIG. 5 is a more detailed block diagram of the collaboration system of FIG. 4, according to one embodiment of the present invention.

FIG. 5 is a more detailed block diagram of the collaboration system of FIG. 4, according to one embodiment of the present invention. As shown, FIG. 5 illustrates similar components as those described above in conjunction with FIG. 4, with certain components illustrated in greater detail. In particular, communication infrastructure 410 is shown to include streaming infrastructure 510 and messaging infrastructure 520. Additionally, display system 100(A) is shown to include appliance 140(A) as well as display 120(A), and display system 100(B) is shown to include appliance 140(B) as well as display 120(B). Computing devices 140(A) and 140(B) include client applications 500(A) and 500(B), respectively.

Display system 100(A) is configured to share content stream A, via communication infrastructure 410, with display system 100(B). In response, display system 100(B) is configured to retrieve content stream A from communication infrastructure 410 and to display that content stream on display 120(B) with content stream B. Likewise, display system 100(B) is configured to share content stream B, via communication infrastructure 410, with display system 100 (A). In response, display system 100(A) is configured to retrieve content stream B from communication infrastructure 410 and to display that content stream on display 120(A) with content stream A. In this fashion, display systems 100(A) and 100(B) are configured to coordinate with one another to generate a shared workspace that includes content streams A and B. Content streams A and B may be used to generate different assets rendered within the shared workspace. In one embodiment, each of display systems 100(A) and 100(B) perform a similar process to reconstruct the shared workspace, thereby generating a local version of that workspace that is similar tom other local version of the workspace reconstructed at other display systems. As a general matter, the functionality of display systems 100(A) and 100(B) are coordinated by client applications 500(A) and 500(B), respectively.

Client applications 500(A) and 500(B) are software programs that generally reside within a memory (not shown) associated with the respective appliances 140(A) and 140 (B). Client applications 500(A) and 500(B) may be executed by a processor unit (not shown) included within the respective computing devices. When executed, client applications 500(A) and 500(B) setup and manage the shared workspace discussed above in conjunction with FIG. 4, which, again, includes content streams A and B. In one embodiment, the shared workspace is defined by metadata that is accessible by both display systems 100(A) and 100(B). Each such display system may generate a local version of the shared workspace that is substantially synchronized with the other local version, based on that metadata.

In doing so, client application 500(A) is configured to transmit content stream A to streaming infrastructure 510 for subsequent streaming to display system 100(B). Client application 500(A) also transmits a notification to display system 100(B), via messaging infrastructure 520, that indicates to display system 100(B) that content stream A is available and can be accessed at a location reflected in the notification. In like fashion, client application 500(B) is configured to transmit content stream B to streaming infrastructure 510 for subsequent streaming to display system 100(A). Client application 500(B) also transmits a notification to display system 100(A), via messaging infrastructure 520, that indicates to display system 100(A) that content stream B is available and can be accessed at a location reflected in the notification. The notification indicates that access may occur from a location within streaming infrastructure 510. Streaming infrastructure 510 and messaging infrastructure 520 are described in greater detail below in conjunction with FIG. 6-7, respectively.

Referring generally to FIGS. 4-5, in operation, when user device 420(A) is connected to display system 100(A), client application 500(A) detects this connection by interacting with software executing on user device 420(A). Client application 500(A) then coordinates the streaming of content stream A from user device 420(A) to appliance 140(A). In response to receiving content stream A, appliance 140(A), or a central controller coupled thereto, decodes and then renders that content stream to display 120(A) in real time. Through this technique, client application 500(A) causes content stream A, derived from user device 420(A), to appear on display 120(A), as shown in FIG. 4.

In addition, client application 500(A) re-encodes the decoded content stream to a specific format and then streams that content stream to streaming infrastructure 510 for buffering and subsequent streaming to display system 100 (B), as also mentioned above. The specific format could be, for example, a Motion Picture Experts Group (MPEG) format, among others. Streaming infrastructure 510 provides access to the buffered content stream at a specific location that is unique to that content. The specific location is derived from an identifier associated with display system 100(A) and an identifier associated with user device 420(A). The location could be, for example, a uniform resource locator (URL), an address, a port number, or another type of locator. Streaming infrastructure 510 may buffer the content stream using any technically feasible approach to buffering streaming content.

In one embodiment, the aforesaid identifiers include a license key associated with display system 100(A), and an index that is assigned to user device 420(A). Display system 100(A) may assign the index to user device 420(A) when user device 420(A) is initially connected thereto. In a further embodiment, streaming infrastructure 510 provides access to content stream A at a URL that reflects a base URL combined with the license key and the index.

In conjunction with streaming content stream A to streaming infrastructure 510, client application 500(A) also broadcasts a notification via messaging infrastructure 520 to display system 100(B). The notification includes the identifiers, mentioned above, that are associated with display system 100(A) and, possibly, user device 420(A). The notification may also include data that specifies various attributes associated with content stream A that may be used to display content stream A. The attributes may include a position, a picture size, an aspect ratio, or a resolution with which to display content stream A on display 120(B), among others, and may be included within metadata described above in conjunction with FIG. 1.

In response to receiving this notification, client application 500(B) parses the identifiers mentioned above from the notification and then accesses content stream A from the location corresponding to those identifiers. Again, in one embodiment, the location is a URL that reflects a license key associated with display system 100(A) and an index associated with user device 420(A). Client application 500(B) may also extract the aforesaid attributes from messaging infrastructure 520, and then display content stream A at a particular position on display 120(B), with a specific picture size, aspect ratio, and resolution, as provided by messaging infrastructure 520. Through this technique, display system 100(A) is capable of sharing content stream A with display system 100(B).

Display system 100(B) is configured to perform a complimentary technique in order to share content stream B with display system 100(A). Specifically, when user device 420(B) is connected to display system 100(B), client application 500(B) detects this connection by interacting with software executing on user device 420(B), then coordinates the streaming of content stream B from user device 420(B) to appliance 140(B). In response to receiving content stream B, appliance 140(B), or a central controller coupled thereto, decodes and then renders content stream B to display 120(B) in real time. Through this technique, client application 500(B) causes content stream B, derived from computing user device 420(B), to appear on display 120(B), as also shown in FIG. 4.

In addition, client application 500(B) re-encodes the decoded content stream to a specific format and then streams that content stream to streaming infrastructure 510 for buffering and subsequent streaming to display system 100(A), as also mentioned above. The specific format could be, for example, an MPEG format, among others. Streaming infrastructure 510 provides access to the buffered content stream at a specific location that is unique to that content. The specific location is derived from an identifier associated with display system 100(B) and an identifier associated with user device 420(B). The location could be, for example, a URL, an address, a port number, or another type of locator.

In one embodiment, the aforesaid identifiers include a license key associated with display system 100(B), and an index that is assigned to user device 420(B). Display system 100(B) may assign the index to user device 420(B) when user device 420(B) is initially connected thereto. In a further embodiment, streaming infrastructure 510 provides access to content stream B at a URL that reflects a base URL combined with the license key and the index.

In conjunction with streaming content stream B to streaming infrastructure 510, client application 500(B) also broadcasts a notification across messaging infrastructure 520 to display system 100(A). The notification includes the identifiers, mentioned above, that are associated with display system 100(B) and user device 420(B). The notification may also include data that specifies various attributes associated with content stream B that may be used to display content stream B. The attributes may include a position, a picture size, an aspect ratio, or a resolution with which to display content stream B on display 120(A), among others.

In response to receiving this notification, client application 500(A) parses the identifiers mentioned above from the notification and then accesses content stream B from the location corresponding to those identifiers. Again, in one embodiment, the location is a URL that reflects a license key associated with display system 100(B) and an index associated with user device 420(B). Client application 500(A) may also extract the aforesaid attributes, and then display content stream B at a particular position on display 120(A), with a specific picture size, aspect ratio, and resolution which may or may not have the same or partially overlapping position on display 120(A), with one or more of the a specific picture size, aspect ratio, and resolution as stream A. Through this technique, display system 100(B) is capable of sharing content stream B with display system 100(A).

Client applications 500(A) and 500(B) are thus configured to perform similar techniques in order to share content streams A and B, respectively with one another. When client application 500(A) renders content stream A on display 120(A) and, also, streams content stream B from streaming infrastructure 510, display system 100(A) thus constructs a version of a shared workspace that includes content stream A and B. Similarly, when client application 500(B) renders content stream B on display 120(B) and, also, streams content stream A from streaming infrastructure 510, display system 100(A) similarly constructs a version of that shared workspace that includes content streams A and B.

An advantage of the techniques described herein is that users who wish to participate in the shared workspace need only plug a device, such as a laptop computer, into a local display system. The user device may then stream real-time video that depicts the display output of that user device to the local display system. The display system, in turn, coordinates the sharing of that real-time video with other display systems. In various other embodiments, a third instance of display system 100 may receive notifications reflective of content streams A and B, and then stream content streams A and B for local display within a version of the shared workspace. In this embodiment, the third instance of display system 100 may or may not receive any content streams from locally coupled user devices.

The display systems 100(A) and 100(B) discussed herein are generally coupled together via streaming infrastructure 510 and messaging infrastructure 520. Each of these different infrastructures may include hardware that is cloud-based and/or collocated on-premises with the various display systems. Persons skilled in the art will recognize that a wide variety of different approaches may be implemented to stream content streams and transport notifications between display systems. However, FIGS. 6-7 set forth exemplary implementations of streaming infrastructure 510 and messaging infrastructure 520, respectively.

Figure 6:
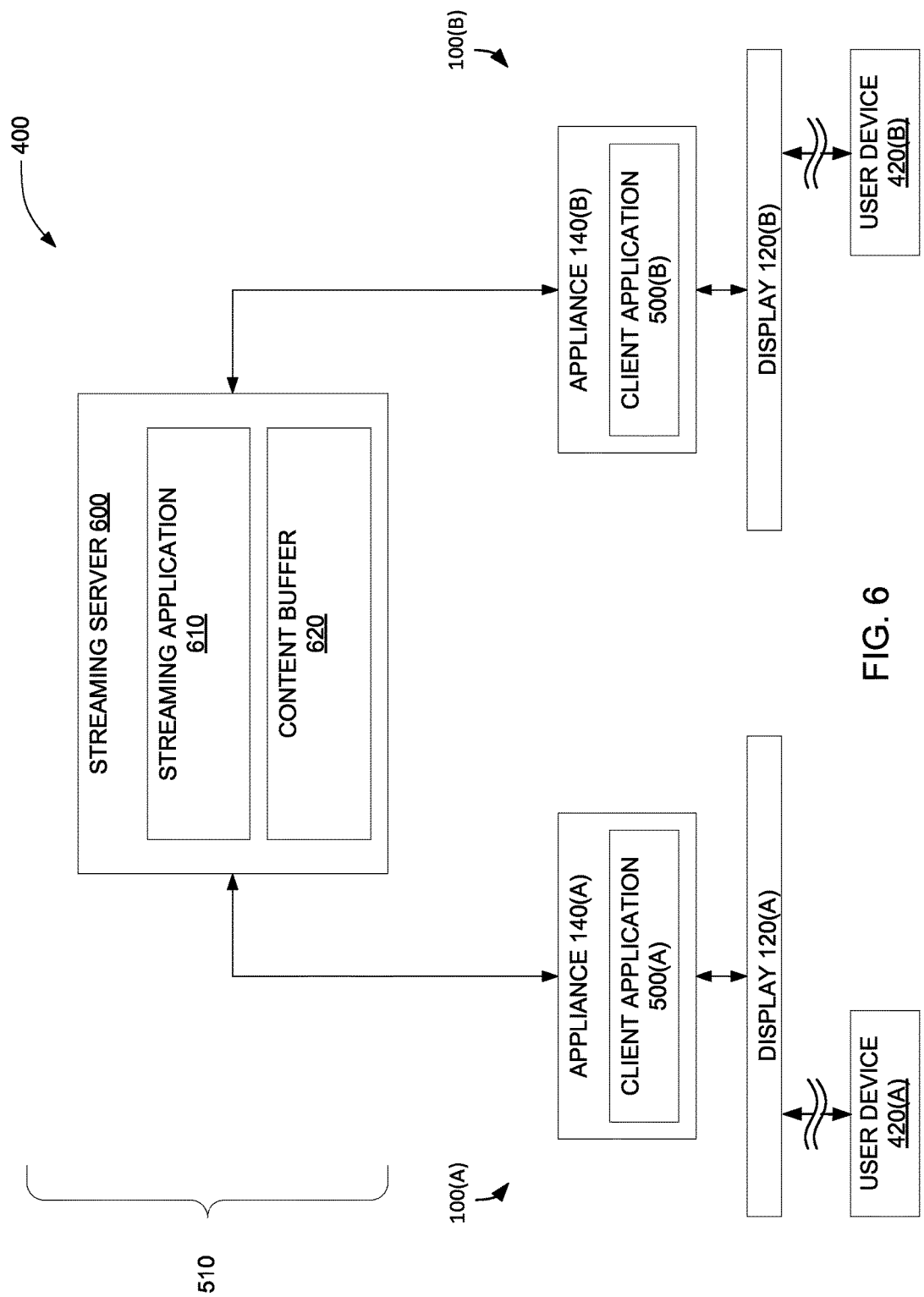
FIG. 6 is a more detailed block diagram of the streaming infrastructure of FIG. 5, according to one embodiment of the present invention.

FIG. 6 is a more detailed block diagram of the streaming infrastructure of FIG. 5, according to one embodiment of the present invention. As shown, streaming infrastructure 510 includes a streaming server 600 that, in turn, includes a streaming application 610 and a content buffer 620. Streaming application 610 is a software application than can be executed by a processor unit (not shown) within streaming server 600 to manage content streams received from display systems 100(A) and 100(B). Streaming application 610 may store those content streams within content buffer 620 for subsequent streaming to display systems 100(A) and 100(B). Content buffer 620 may be any technically feasible form of memory, including random access memory (RAM), flash memory, a hard disk, and so forth.

In one embodiment, streaming application 610 is configured to receive content streams from display systems 100(A) and/or 100(B) in an MPEG format. Streaming application 610 may then transcode that content stream to a multi-bit rate real-time streaming protocol (RTSP) stream for streaming to other display systems 100. With this approach, display systems 100 that are configured to stream the aforesaid content stream may select a particular bit rate with which to stream that content. Accordingly, a given display system may limit the total bandwidth consumed when streaming content streams from server machine 600 to less than a maximum value. In other embodiments, streaming server 610 may down sample a content stream to accommodate mobile display systems or other display systems with lower resolution display screens.

Figure 7:
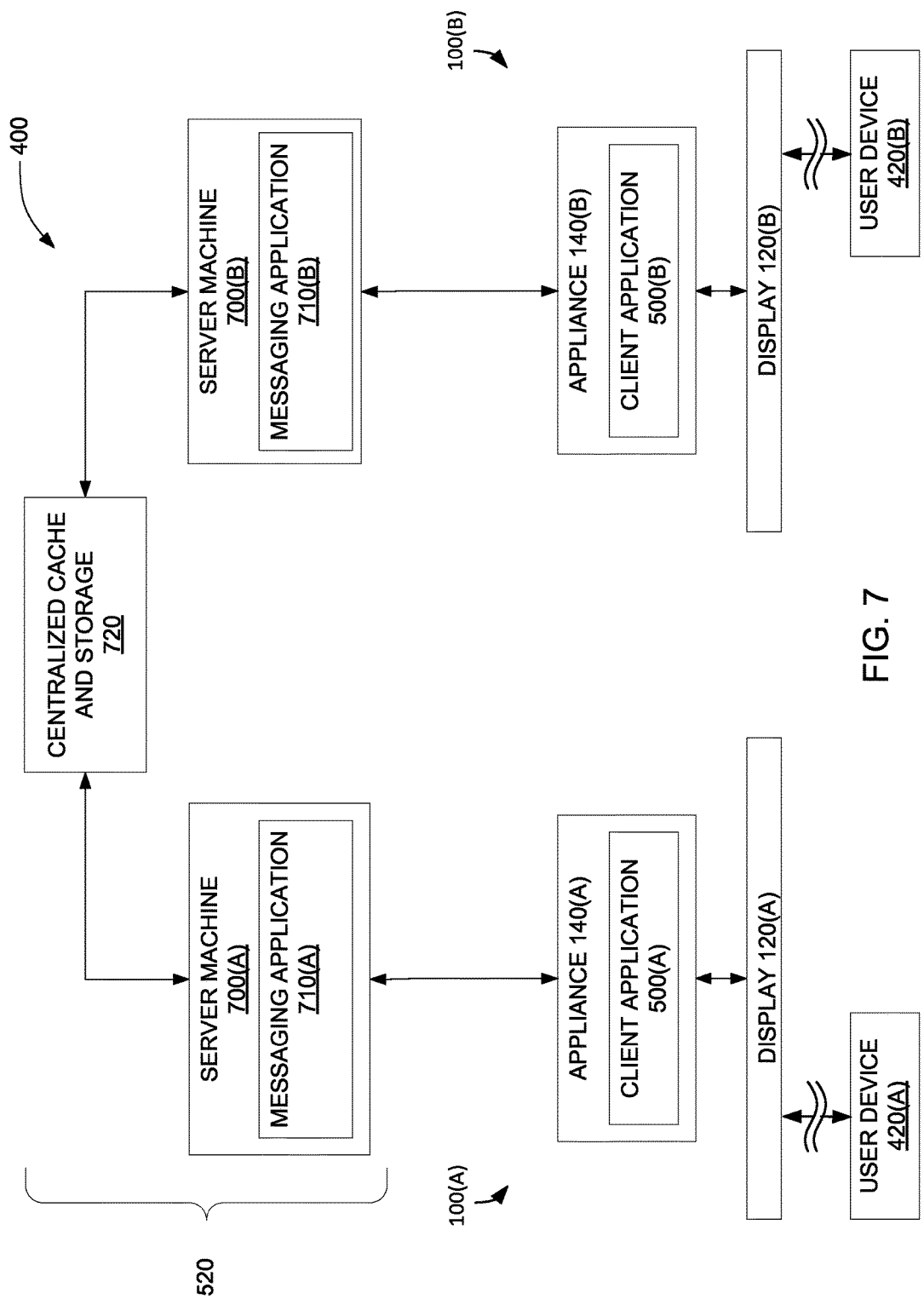
FIG. 7 is a more detailed block diagram of the messaging infrastructure of FIG. 5, according to one embodiment of the present invention.

FIG. 7 is a more detailed block diagram of the messaging infrastructure of FIG. 5 in greater detail, according to one embodiment of the present invention. As shown, messaging infrastructure 520 includes server machines 700(A) and 700(B) coupled together via centralized cache and storage 720. Server machine 700(A) is coupled to appliance 140(A) and includes a messaging application 710(A). Server machine 700(B) is coupled to appliance 140(B) and includes a messaging application 710(B).

Server machines 700(A) and 700(B) are generally cloud-based or on-premises computing devices that include memory (not shown) and processor units (not shown) configured to store and execute messaging applications 710(A) and 710(B), respectively. Messaging applications 710(A) and 710(B) are configured to generate real-time socket connections with computing devices 140(A) and 140(B), respectively, to allow notifications and other types of messages to be transported quickly. In one embodiment, messaging applications 710(A) and 710(B) are implemented as ASP.NET applications and rely on signalR WebSockets to accomplish fast, real-time messaging.

Centralized cache and storage 720 provide a persistent messaging back-end through which messages can be exchanged between messaging applications 710(A) and 710(B). In one embodiment, centralized cache and storage includes a Redis cache backed by a SQL database. Messaging applications 710(A) and 710(B) may be configured to periodically poll centralized cache and storage 720 for new notifications, thereby allowing messages to be delivered to those applications quickly.

In operation, when display system 100(A) transmits a notification indicating that content stream A is available on streaming infrastructure 510, as described above, display system 100(A) transmits that notification to messaging application 710(A). Messaging application 710(A) may then relay the notification to centralized cache and storage 720. Messaging application 710(B) polls centralized cache and storage 720 periodically, and may thus determine that that the notification has arrived. Messaging application 710(B) then relays the notification to display system 100(B). As previously discussed, display system 100(B) may then parse the notification to retrieve the identifiers associated with display system 100(A) and user device 420(A), and then stream content associated with user device 420(A) from streaming server 610.

Referring generally to FIGS. 4-7, the various techniques discussed thus far may be extended according to a variety of possible embodiments. In one embodiment, each display system 100 is configured to receive commands associated with the content streams displayed on the corresponding display 120, and to then relay those commands to the user device from which the content stream originates for execution. For example, referring to FIGS. 4 and 5, display system 100(A) could receive commands directed towards content stream A, and then relay those commands to user device 420(A) for execution by user device 420(A). In like fashion, display system 100(A) could receive commands directed towards content stream B, and then relay those commands, via messaging infrastructure 520, to display system 100(B) and then user device 420(B) for execution by that device. The commands could be, for example, touch inputs received via display 120 or other types of inputs. With this technique, display systems 100(A) and 100(B) provide remote desktop functionality that can be used to control any user device coupled to those display systems.

In another embodiment, each display system 100 is configured to receive conventional commands for pausing and rewinding content streams. For example, display system 100(A) could receive input indicating that content stream A should be paused and frozen in the current state until unpaused. In another example, display system 100(A) could receive input indicating that content stream B should be returned to a state that occurred 10 seconds before, and then replayed.

Various other embodiments of the invention contemplate architectural variations of collaboration system 400. In one such embodiment, the functionality of appliance 140(A) and client application 500(A) is included within, and implemented by, user device 420(A). For example, user device 420(A) could be a computing device configured to execute client application 500(A) (or some version thereof) in order to perform the functionality of appliance 140(A) discussed herein. In a further embodiment, user device 420(A) also includes display 120(B).

In another embodiment, user device 420(A) is coupled to appliance 140(A) and configured to output content stream A to appliance 140(A) without appliance 140(A) generating and displaying that workspace on display 120(A). In this embodiment, display 120(A) may be omitted entirely.

Figure 8:
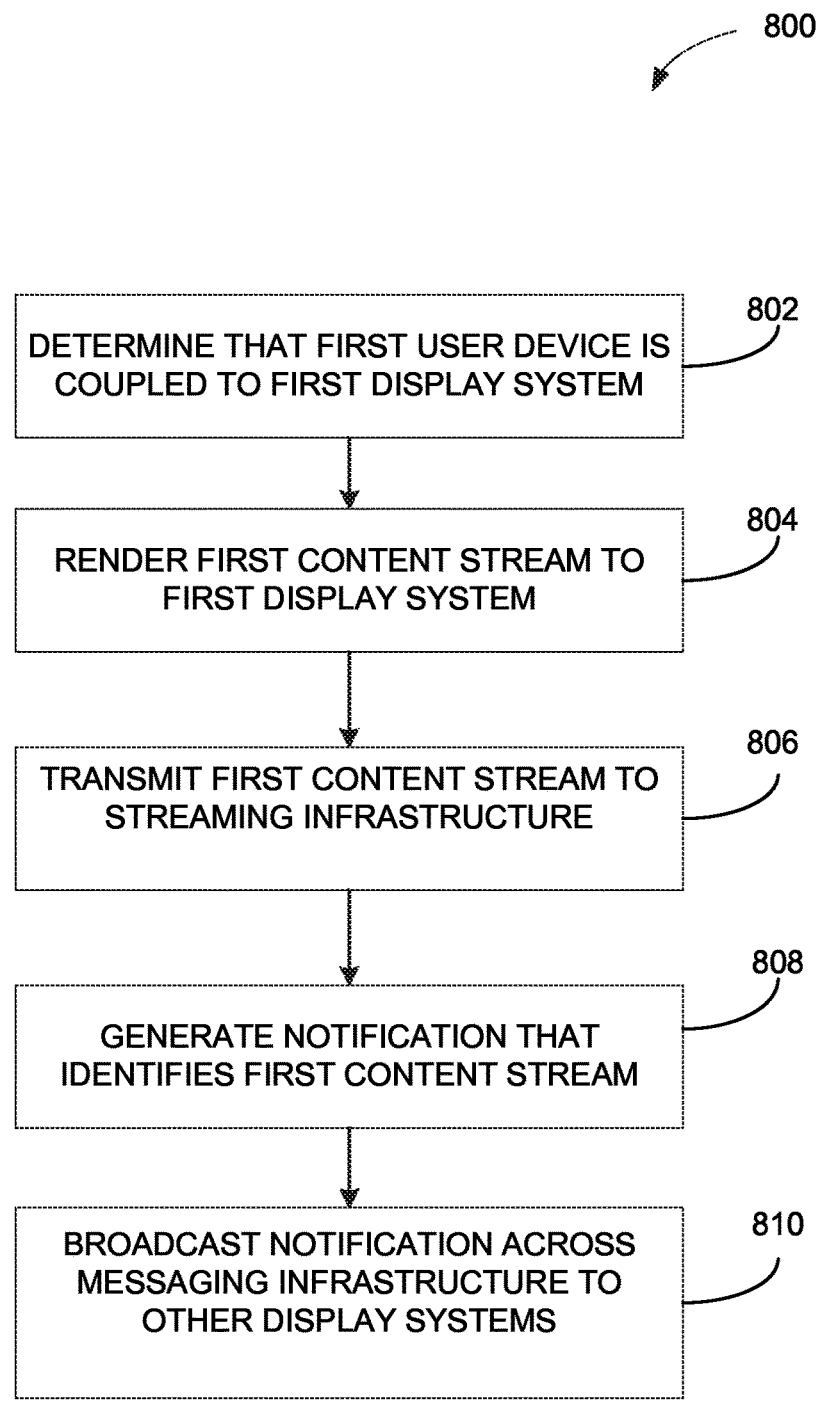
FIG. 8 sets forth a flowchart of method steps for sharing a content stream across one or more instances of a display system, according to one embodiment of the present invention.

FIG. 8 sets forth a flowchart of method steps for sharing a content stream across one or more instances of a display system, according to one embodiment of the present invention. Although the method steps are described in conjunction with the systems of FIGS. 1-7, persons skilled in the art will understand that any system configured to perform the method steps, in any order, is within the scope of the present invention.

As shown, a method 800 begins at step 802, where client application 500(A) determines that user device 420(A) is coupled to display system 100(A) via data connection 430(A). User device 420(A) is configured to output content stream A, as shown in FIG. 4. Client application 500(A) may interact with a software program executing on user device 420(A) to identify that a connection has been made. Data connection 420(A) may be an HDMI cable or wireless connection, among others.

At step 804, client application 500(A) causes a central controller coupled to display 120(A) to render content stream A on display 120(A). The central controller could be, for example, central controller 110 shown in FIG. 1.

At step 806, client application 500(A) streams content stream A to streaming infrastructure 510. In response, streaming infrastructure 510 publishes the content stream at a particular location that is based on identifiers associated with display system 100(A) and user device 420(A).

At step 808, client application 500(A) generates a notification that identifies content stream A. The notification includes the identifiers associated with display system 100(A) and user device 420(A). The notification may also include display attributes associated with content stream A, including a position where that content should be displayed, among other possibilities.

At step 810, client application 500(A) broadcasts the notification across messaging infrastructure 520. Display system 100(B) may then receive the notification and perform a method described below in conjunction with FIG. 9.

Figure 9:
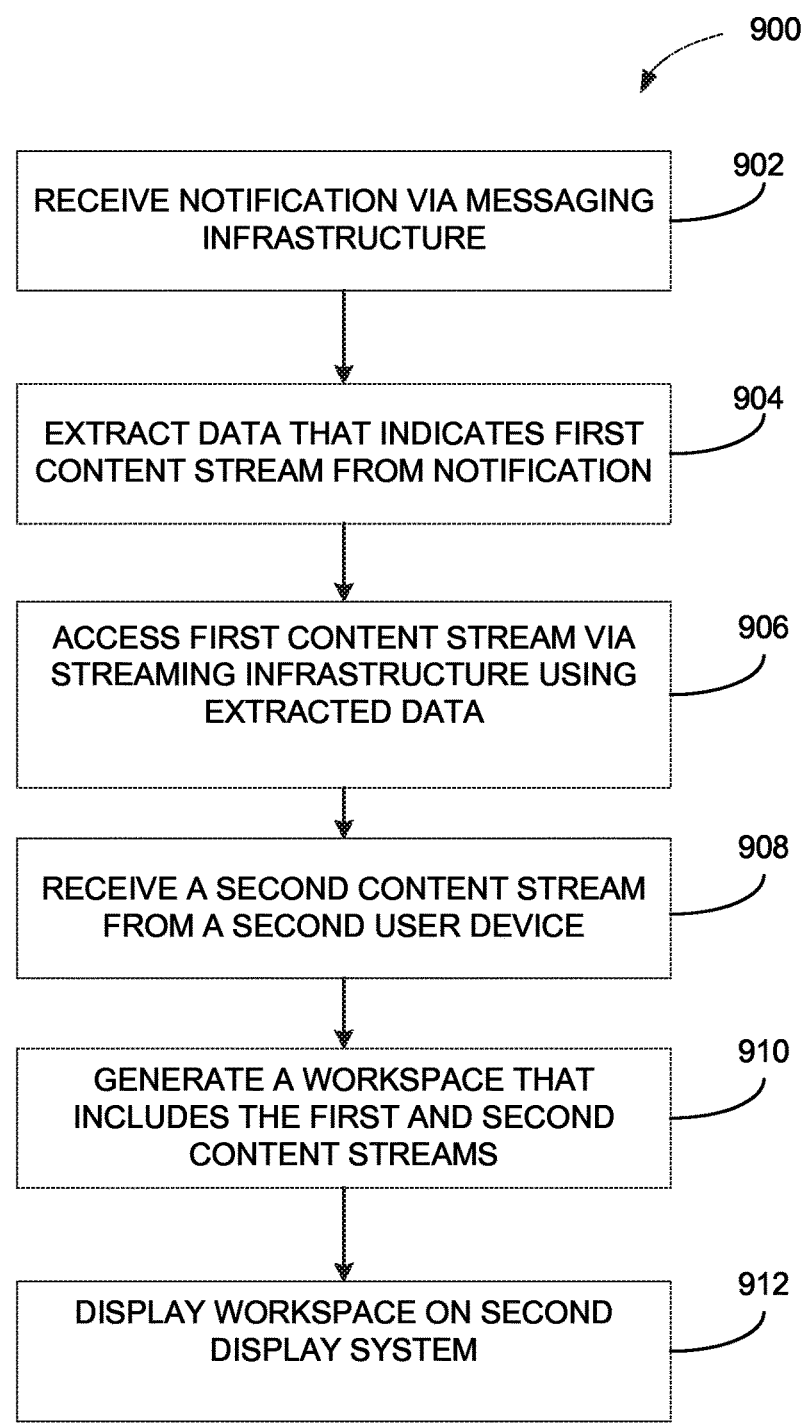
FIG. 9 sets forth a flowchart of method steps for displaying a shared workspace that includes content streams received from one or more instances of a display system, according to one embodiment of the present invention.

FIG. 9 sets forth a flowchart of method steps for displaying a shared workspace that includes a content stream received from an instance of a display system, according to one embodiment of the present invention. Although the method steps are described in conjunction with the systems of FIGS. 1-7, persons skilled in the art will understand that any system configured to perform the method steps, in any order, is within the scope of the present invention.

As shown, a method 900 begins at step 902, where client application 500(B) receives a notification via messaging infrastructure 520 transmitted by client application 500(A). The notification indicates that content stream A is available for streaming, and also includes identifiers associated with display system 100(A) and user device 420(A) that can be used to access content stream A.

At step 904, client application 500(B) extracts the identifiers from the notification. In one embodiment, the identifiers include a license key associated with display system 100(A) and an index assigned to user device 420(A).

At step 906, client application 500(B) accesses content stream A from streaming infrastructure 510 using the identifiers extracted at step 904. Client application 500(B) may access content stream A by constructing a URL that includes the license key and index, and then streaming content stream A from that URL.

At step 908, client application 500(B) receives content stream B from user device 420(B). Client application 500(B) may interact with software executing on user device 420(B) in order to identify that user device 420(B) is coupled to display system 100(B) and outputting content stream B.

At step 910, client application 500(B) generates a workspace that includes content stream A and content stream B. In doing so, client application 500(B) may allocate separate memory and/or frame buffer space for the workspace, content stream A, and content stream B. Alternatively, client application 500(B) could allocate one region of memory and/or frame buffer space for the workspace, and content streams A and B.

At step 912, client application 500(B) displays the workspace on display 120(B), including content stream A and content stream B. Client application 500(A) may perform a similar technique in order to display a version of the same workspace, including content stream and content stream B. With this approach, client applications 500(A) and 500(B) may interoperate to generate and display substantially similar workspaces, including the same content streams A and B. In addition, those workspaces may be substantially synchronized in real time.

In sum, a client application coupled to a display generates a shared workspace that includes a content stream derived from a local user device a well as one or more content streams derived from remote devices. The client application is configured to detect when a user device is coupled locally, and to render a content stream derived from that user device to the display. In addition, the client application also publishes the content stream to a central server. Other client applications associated with other displays may then stream the content stream for local display. The other client applications may also publish to the central server the one or more content streams derived from local devices. The client application may stream those content streams for display on the display. In this fashion, the client application displays locally generated content streams as well as remotely generated content streams. Each of the other client applications functions similarly, and may thus display different versions of the shared workspace.

At least one advantage of the present invention is that users may participate in the shared workspace simply by coupling a user device to the client application. Accordingly, the user need not request leader status or manually configure any settings in order to share a content stream. In addition, since each display displays the same shared workspace, and that workspace displays a multitude of different sources of content streams, the various users viewing that workspace may collaborate more effectively The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., video processing and/or speech analysis applications) or related data available in the cloud.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for sharing content streams across a plurality of displays, the method comprising:

receiving, at a first display system, a first stream from a first user device, the first stream being associated with a first set of stream display attributes;

polling, at the first display system, a stream server for new notifications received at the stream server from a second display system, the second display system comprising a second user device;

in response to the polling, receiving, at the first display system from the stream sever, a first notification originating from the second display system, the first notification including a second set of stream display attributes associated with a second stream from the second user device and first data indicating a location to access the second stream, the location comprising a uniform resource locator (URL) combined with a first identifier for the second display system and a second identifier for the second user device;

parsing the first notification to extract the second set of stream display attributes and the first data;

in response to receiving the first notification from the second display system, accessing, based on the first data included in the first notification, the second stream from the stream server, wherein the second stream originates from the second user device;

generating a first workspace that includes displaying the first stream within a first presentation window and the second stream within a second presentation window; and causing the first workspace along with the first stream and the second stream to be displayed on a first display, wherein the first stream is displayed according to the first set of stream display attributes that includes at least one of a position on the display, a picture size and an aspect ratio, and the second stream is displayed according to the extracted second set of stream display attributes, that includes at least one of a position on the display, a picture size and an aspect ratio.

2. The computer-implemented method of claim 1, further comprising:

generating a second notification that includes second data that identifies the first stream; and transmitting the second notification to the second display system via a messaging infrastructure, wherein the second display system is configured to access and display the first stream from the stream server based on the second notification.

3. The computer-implemented method of claim 2, further comprising:

receiving at the second display system the second notification originating from the first display system;

parsing at the second display system the second notification to extract the second data;

accessing at the second display system the first stream based on the second data from the stream server;

generating a second workspace that includes the first stream and the second stream; and causing the second workspace to be displayed on a second display.

4. The computer-implemented method of claim 3, wherein the second notification further includes the first set of stream display attributes that reflect display settings for the first stream, and further comprising:

parsing the second notification to extract the first set of stream display attributes; and displaying the first stream within the second workspace based on the first set of stream display attributes.

5. The computer-implemented method of claim 3, wherein the first workspace and the second workspace comprise substantially similar data that is substantially synchronized in real time.

6. The computer-implemented method of claim 3, further comprising:
receiving a command directed towards at least one of the first workspace and the second workspace; and
in response, causing at least one of the first user device and the second user device to execute the command.

7. The computer-implemented method of claim 3, further comprising:
receiving a command directed towards at least one of the first workspace and the second workspace; and
in response, replaying a portion of at least one of the first stream and the second stream.

8. The computer-implemented method of claim 1, further comprising down sampling the second stream based on a display resolution associated with the first display.

9. The computer-implemented method of claim 1, wherein the first user device is coupled to the first display and configured to output the first stream to the first display.

10. The computer-implemented method of claim 1, wherein the second user device is coupled to a second display and configured to output the second stream to the second display.

11. The computer-implemented method of claim 1, wherein the steps of receiving the first stream, receiving the first notification, parsing, accessing, generating, and causing are performed by a software module that resides in the first user device.

12. A non-transitory computer-readable medium storing program instructions that, when executed by a processor, cause the processor to share content streams across a plurality of displays, by performing the steps of:
receiving, at a first display system, a first stream from a first user device, the first stream being associated with a first set of stream display attributes;
polling, at the first display system, a stream server for new notifications received at the stream server from a second display system, the second display system comprising a second user device;
in response to the polling, receiving, at the first display system from the stream sever, a first notification originating from the second display system, the first notification including a second set of stream display attributes associated with a second stream from the second user device and first data indicating a location to access the second stream, the location comprising a uniform resource locator (URL) combined with a first identifier for the second display system and a second identifier for the second user device;
parsing the first notification to extract the second set of stream display attributes and the first data;
in response to receiving the first notification from the second display system, accessing, based on the first data included in the first notification, the second stream from the stream server, wherein the second stream originates from the second user device;
generating a first workspace that includes displaying the first stream within a first presentation window and the second stream within a second presentation window; and
causing the first workspace along with the first stream and the second stream to be displayed on a first display, wherein the first stream is displayed according to the first set of stream display attributes that includes at least one of a position on the display, a picture size and an aspect ratio, and the second stream is displayed according to the extracted second set of stream display attributes, that includes at least one of a position on the display, a picture size and an aspect ratio.

13. The non-transitory computer-readable medium of claim 12, further comprising:
generating a second notification that includes second data that identifies the first stream; and
transmitting the second notification to the second display system via a messaging infrastructure, wherein the second display system is configured to access and display the first stream from the stream server based on the second notification.

14. A system for sharing content streams across a plurality of displays, comprising:
a first user device configured to generate and output a first stream; and
a first display system that includes:
a first display, and
a first appliance that has:
a first memory storing a first client application, and
a first processor that, in conjunction with executing the first client application:
receives the first stream from the first user device, the first stream being associated with a first set of stream display attributes,
polls a stream server for new notifications received at the stream server from a second display system, the second display system comprising a second user device,
in response to the polling, receives from the stream sever, a first notification originating from the second display system, the first notification including a second set of stream display attributes associated with a second stream from the second user device and first data indicating a location to access the second stream, the location comprising a uniform resource locator (URL) combined with a first identifier for the second display system and a second identifier for the second user device,
parses the first notification to extract the second set of stream display attributes and the first data,
in response to receiving the first notification from the second display system, accesses, based on the first data included in the first notification, the second stream from the stream server, wherein the second stream originates from the second user device,
generates a first workspace that includes displaying the first stream within a first presentation window and the second stream within a second presentation window, and
causes the first workspace, the first stream, and the second stream to be displayed on the first display, wherein the first stream is displayed according to the first set of stream display attributes that includes at least one of a position on the display, a picture size, and an aspect ratio, and the second stream is displayed according to the extracted second set of stream display attributes, that includes at least one of a position on the display, a picture size, and an aspect ratio.

15. The system of claim 14, further comprising:
a second user device, configured to generate and output the second stream; and a second display system that includes:
  a second display, and
  a second appliance that has:
    a second memory storing a second client application, and
    a second processor that, in conjunction with executing the second client application:
      receives the second stream from the second user device,
      transmits the second stream to the stream server, and
      transmits the first notification to the first display system, via a messaging infrastructure, that identifies the second stream, wherein the first processor is configured to access the second stream, from the stream server, based on the first notification.

16. The system of claim 15, wherein the first processor, in conjunction with executing the first client application, transmits the first stream to the stream server, and the second processor, in conjunction with executing the second client application:
  accesses the first stream from the stream server;
  generates a second workspace that includes the first stream and the second stream; and
  causes the second workspace, the first stream, and the second stream to be displayed on the second display.

17. The system of claim 15, further comprising:
a third display system that includes:
  a third display, and
  a third appliance that has:
    a third memory storing a third client application, and
    a third processor that, in conjunction with executing the third client application:
      receives the first stream,
      receives the second stream,
      generates a third workspace that includes the first stream and the second stream, and
      causes the third workspace, the first stream, and the second stream to be displayed on the third display.

18. The computer-implemented method of claim 1, further comprising:
  at the first display system, transmitting a second notification to the stream server, the second notification including the first set of stream display attributes associated with the first stream.

19. The computer-implemented method of claim 1, wherein the first workspace further includes at least one asset having associated metadata specifying, for the at least one asset, an aspect ratio and a position in terms of percent location along an x-axis and y-axis of the first workspace.

* * * * *

UNITED STATES PATENT AND TRADEMARK OFFICE
CERTIFICATE OF CORRECTION

| | |
|---|---|
| PATENT NO. | : 9,906,594 B2 |
| APPLICATION NO. | : 14/675602 |
| DATED | : February 27, 2018 |
| INVENTOR(S) | : Adam P. Cuzzort and Brandon Fischer |

Page 1 of 1

It is certified that error appears in the above-identified patent and that said Letters Patent is hereby corrected as shown below:

On the Title Page

(54) Title and in the Specification, Column 1, Lines 1-3 please delete "TECHNIQUES FOR SHAPING REAL-TIME CONTENT BETWEEN MULTIPLE ENDPOINTS" and insert --TECHNIQUES FOR SHARING REAL-TIME CONTENT BETWEEN MULTIPLE ENDPOINTS--.

Signed and Sealed this
Seventeenth Day of April, 2018

Andrei Iancu
*Director of the United States Patent and Trademark Office*